Dec. 14, 1937.   C. D. HEVENOR   2,102,120
AUTOMOBILE BUMPER
Filed Sept. 3, 1936   2 Sheets—Sheet 2
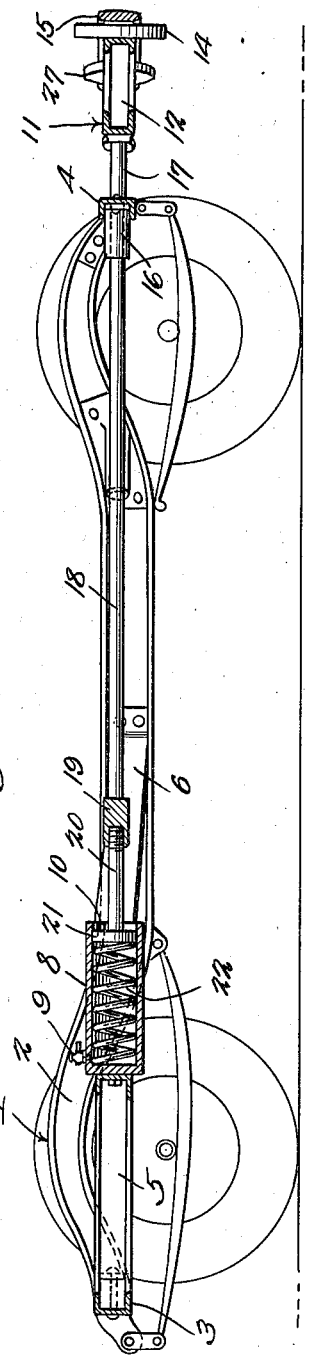
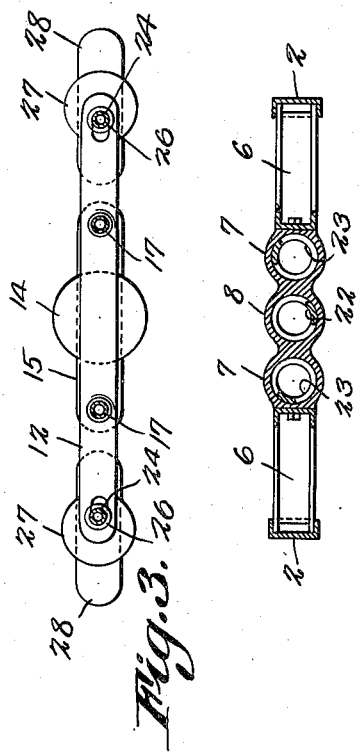
Inventor
C. D. Hevenor
By C. A. Snow & Co.
Attorneys Patented Dec. 14, 1937

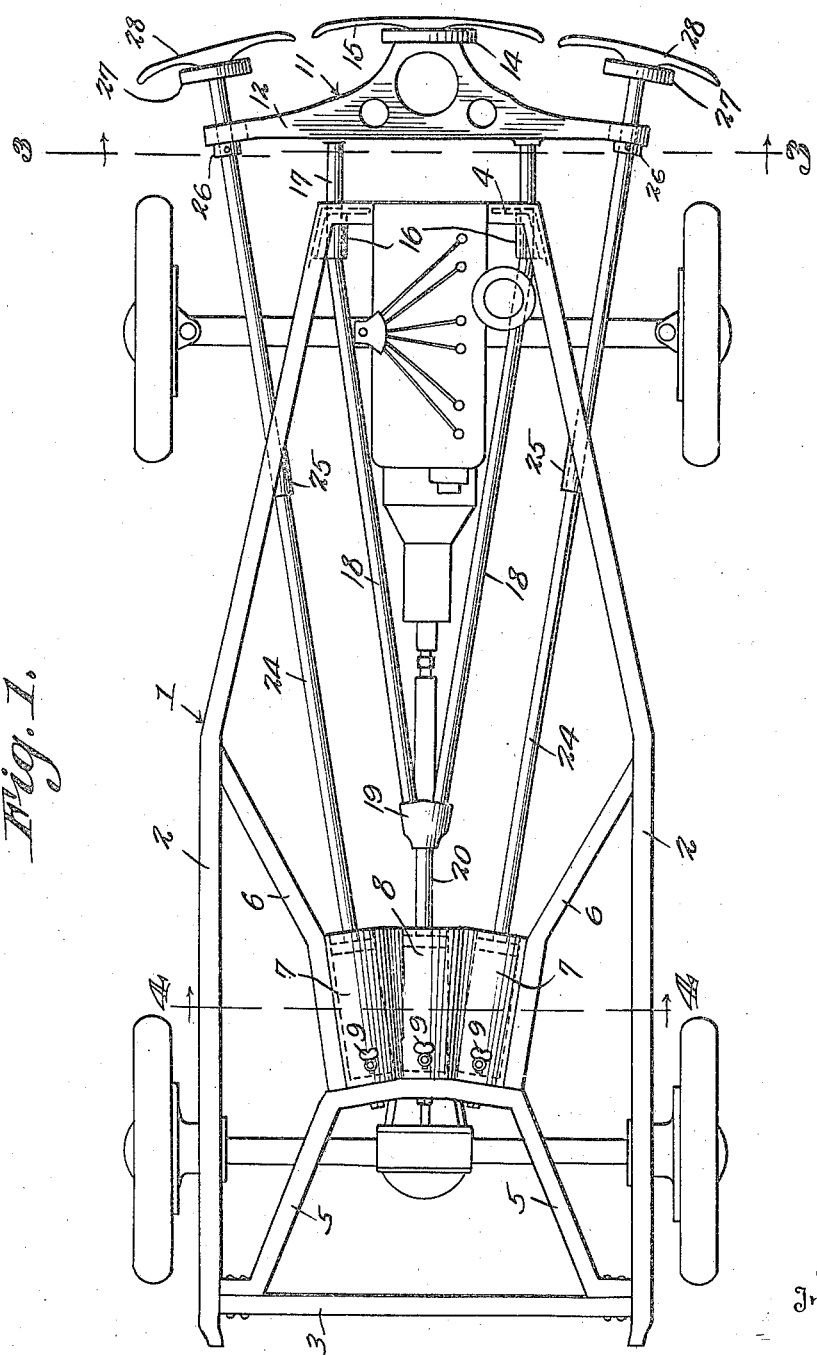

2,102,120

UNITED STATES PATENT OFFICE 2,102,120

AUTOMOBILE BUMPER

Charles D. Hevenor, Buffalo, N. Y.

Application September 3, 1936, Serial No. 99,278

2 Claims. (Cl. 293—55)

The device forming the subject matter of this application is a bumper mechanism for an automobile. One object of the invention is to supply a device of the class described wherein side bumpers may operate independently of each other, and independently of a main or intermediate bumper, all of the bumpers being provided with means for cushioning their rearward movement, the construction being such that, when the main or intermediate bumper moves rearwardly, not only the cushioning means for that bumper, but the cushioning means for the side bumpers, as well, will become effective.

Another object of the invention is to provide novel means whereby the impact or thrust imposed upon any of the bumpers will be transformed into a pull throughout the major portion of the chassis of the vehicle, at the forward portion of the chassis.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 shows in top plan, a device constructed in accordance with the invention;

Fig. 2 is a longitudinal section;

Fig. 3 is a cross section on the line 3—3 of Fig. 1;

Fig. 4 is a cross section on the line 4—4 of Fig. 1.

The numeral 1 marks the wheel mounted chassis of an automobile. The chassis 1 comprises side rails 2, a rear bar 3 and a front piece 4. A U-shaped bracket 5 is disposed within the contour of the chassis 1 and projects forwardly, the rear end of the bracket being secured to the rear bar 3, in the angles defined by the rear bar 3 and the side rails 2. The rear ends of forwardly diverging braces 6 are secured to the forward end of the bracket 5. The forward ends of the braces 6 are secured to the side rails 2.

Outer cylinders 7 and an intermediate cylinder 8 are joined together in a unitary structure and are secured to the rear portions of the braces 6, and to the forward end of the bracket 5, between the rear portions of the braces. If desired, cocks 9 may be mounted on the cylinders 7 and 8. The cocks are simply for the purpose of admitting air conveniently to the cylinders 7 and 8 behind the pistons (hereinafter described) that are slidably mounted in the cylinders. In the ordinary operation of the device, the cocks 9 are closed. The forward ends of the cylinders 7 and 8 are vented in any suitable way, so that the pistons can move forward freely. If desired, the forward ends of the cylinders 7 and 8 may be open, as shown at 10.

A main bumper is provided, and is designated generally by the numeral 11. The main bumper 11 comprises a forwardly tapered beam 12 disposed ahead of the forward end of the chassis 1 and carrying a disk 14 on which an impact element 15 is secured. There are guides 16 on the forward end of the chassis 1. The straight, parallel, forward parts 17 of a fork are mounted to reciprocate in the guides 16, and the said parts of the fork are secured to the beam 12 of the main bumper 11. The fork comprises rearwardly converging members 18 joined by a coupling 19 to a rod 20 carrying a piston 21, the piston 21 being mounted to reciprocate in the intermediate cylinder 8. The cushioning means in the intermediate cylinder 8 may be of any desired form. The cushioning means may comprise a compression spring 22 in the cylinder 8, interposed between the piston 21 and the rear head of the cylinder. The cylinder 8 is full of air, behind the piston 21, and a cushion, therefore, is afforded both by the air and by the compression spring 22. Either of these cushioning means may be used to the exclusion of the other, or both may be used together.

Auxiliary or side bumpers are provided, and each includes a rod 24 slidable in a guide 25 on the side rails 2 of the chassis 1. The rods 24 are arranged in diverging relation to each other, as they extend forwardly. There are abutment collars 26 secured to the rods 24, immediately behind the ends of the beam 12 of the main bumper, and the rods 24 have longitudinal sliding movement in the ends of the beam. Each rod 24 has a disk 27 fixed to its forward end, and each disk carries a rearwardly inclined impact element 28. The rear ends of the rods 24 carry pistons, like the piston 21, the pistons of the rods 24 being mounted for reciprocation in the cylinders 7. The cylinders 7 have their compression springs 23, constructed like the compression spring 22 of the intermediate cylinder 8.

In practical operation, if one of the impact elements 28 receives a blow, the corresponding rod 24 moves rearwardly, compressing its spring 23 and the air in the cylinder 7. If, however, the main bumper 11 moves rearwardly, then the parts 17, 18, 19 and 20 move the piston 21 backwardly, compressing the spring 22 and the air in the cylinder 8. When the beam 12 of the main bumper 11 moves rearwardly, the ends of the beam cooperate with the collars 26 on the rods 24, and carry them backwardly, compression being effected in the cylinders 7.

From the foregoing, it will be noted that the side bumper mechanisms, represented by the rods 24, can operate independently of each other, and independently of the main bumper 11. When, however, the main bumper 11 is operated, the side bumpers are carried backwardly, and the compression in the cylinders 7 aids in resisting the blow which has been imparted to the impact element 15 of the main bumper. If the blow imparted to the impact element 15 of the main bumper glances off upon one of the impact elements 28, then the corresponding side bumper comes into play.

It is to be observed that the impact imposed on the main bumper element 15 is carried backwardly along a line half way between the sides of the chassis 1, and the impact imparted to either of the bumper elements 28 is carried backwardly to a position very close to that line. Therefore, when any of the bumper elements 28 or 15 receives a hard shock, there will be a minimum tendency for the forward end of the vehicle to swing laterally, and that observation is particularly true in view of the fact that the cylinders 7 and 8 are located near to the rear of the chassis 1.

Because the cylinders 7 and 8 are located near to the rear end of the chassis frame, the thrust imposed on the chassis frame is transformed into a pull throughout the forward part of the chassis frame. This is advantageous, because a chassis frame will buckle under thrust or compression much more readily than it will stretch or part under a direct pull.

The engagement between the forward portions of the members 18 and the guides 16 limits the forward movement of the main bumper 11, and the forward movement of the side bumpers is limited by engagement between the abutment collars 26 on the members 18 and the beam 12 of the main bumper 11. The device is strongly constructed and well adapted to stand hard use. Dimensions may be changed without departing from the spirit of the invention.

Having thus described the invention, what is claimed is:

1. In a device of the class described, a main bumper, auxiliary bumpers disposed on opposite sides of the main bumper and at the ends thereof and exposed to receive impact, means for mounting the auxiliary bumpers for rearward movement independently of each other and independently of the main bumper, means for mounting the main bumper for rearward movement, separate cushioning means yieldably resisting the rearward movement of each bumper, and means for transmitting rearward movement from the main bumper to the auxiliary bumpers, thereby to render all of the cushioning means effective when the main bumper moves rearwardly.

2. In a device of the class described, a vehicle chassis comprising side rails, a bumper structure extended ahead of the chassis, and cushioning means yieldably resisting the rearward movement of the bumper structure, the cushioning means being located in and symmetrically with respect to the median longitudinal axis of the chassis, within the chassis and in widely-spaced relation to the side rails, and close to the rear end of the chassis, thereby to transform the thrust imposed upon the bumper structure, into a pull throughout the major forward portion of the chassis, the pull being exerted in the median longitudinal axis, and closely adjacent thereto, and far enough inwardly from the side rails, so that the forward end of the chassis will have a minimum tendency to swing laterally when the bumper structure receives impact.

CHARLES D. HEVENOR.